July 9, 1940.   V. G. VAUGHAN ET AL   2,207,422
PROTECTIVE MOTOR STARTING SWITCH
Filed Nov. 14, 1938   3 Sheets-Sheet 1
FIG.2.   FIG.1.   FIG.3.
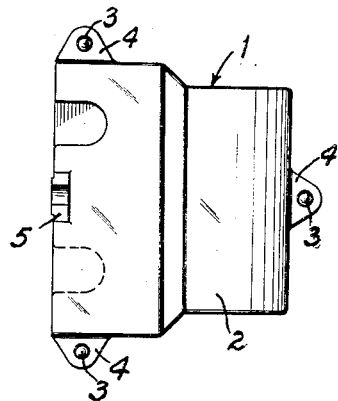
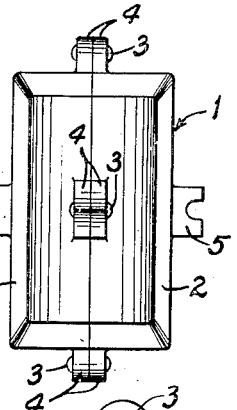
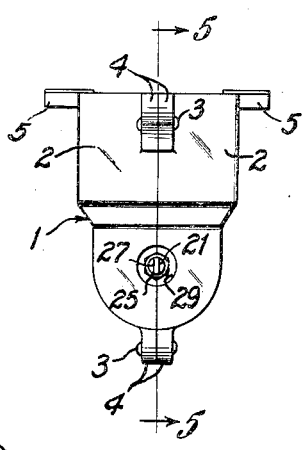
FIG.4.
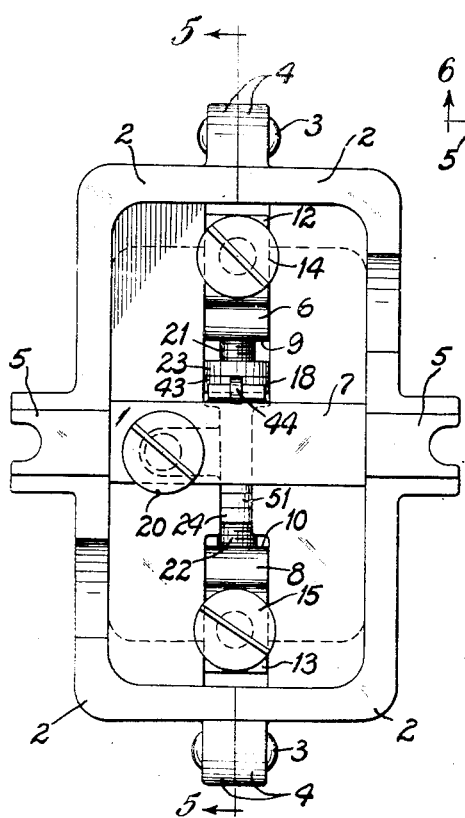
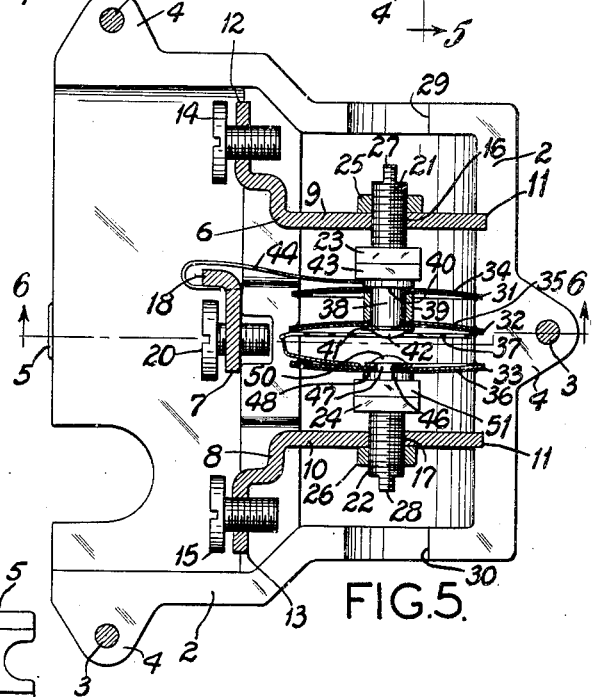
FIG.5.
Victor G. Vaughan,
John D. Bolesky,
Inventors
Haynes, Koenig and Wolf,
Attorneys July 9, 1940.  V. G. VAUGHAN ET AL  2,207,422
PROTECTIVE MOTOR STARTING SWITCH
Filed Nov. 14, 1938  3 Sheets-Sheet 2
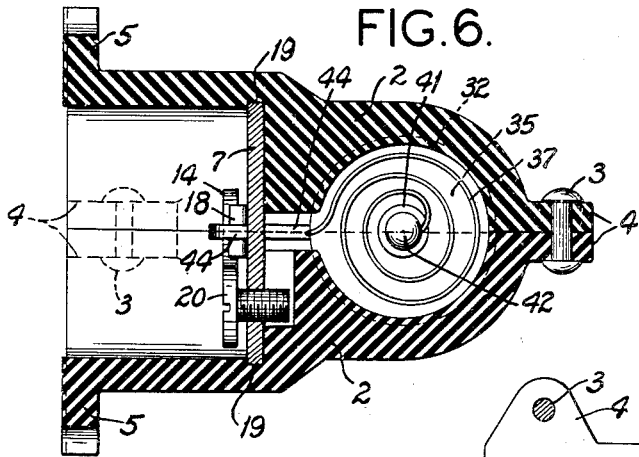
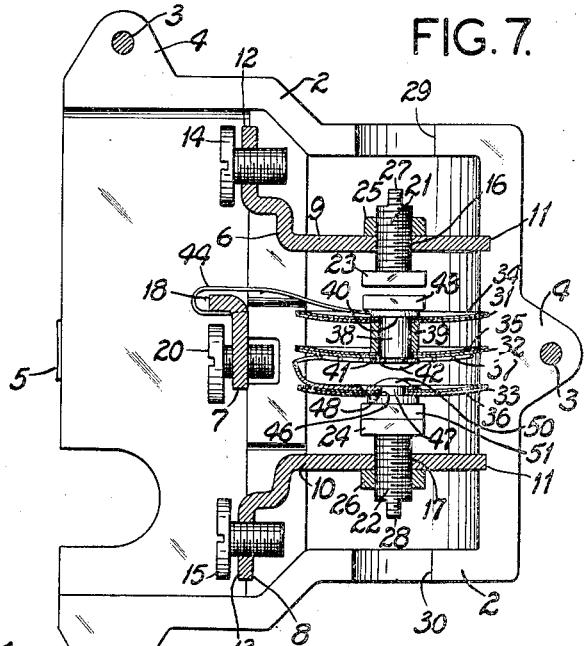
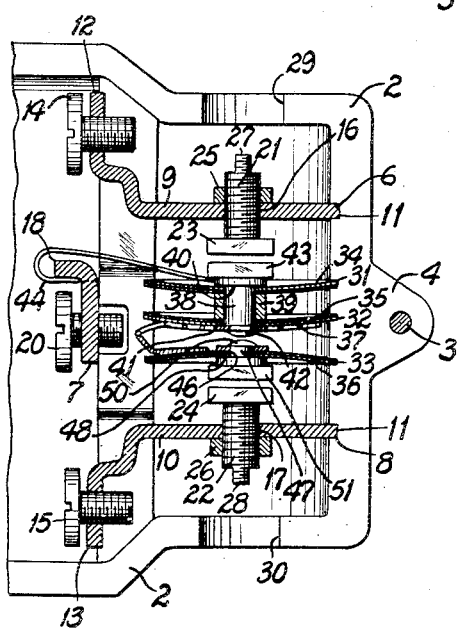
Victor G. Vaughan,
John D. Bolesky,
Inventors,
Haynes, Koenig and Wolf,
Attorneys.

July 9, 1940. V. G. VAUGHAN ET AL 2,207,422
PROTECTIVE MOTOR STARTING SWITCH
Filed Nov. 14, 1938 3 Sheets-Sheet 3
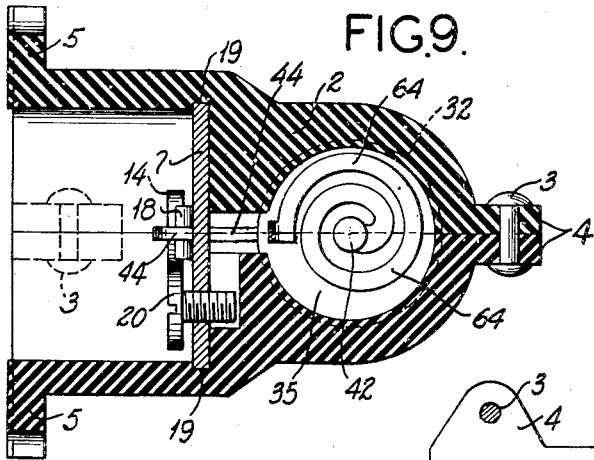
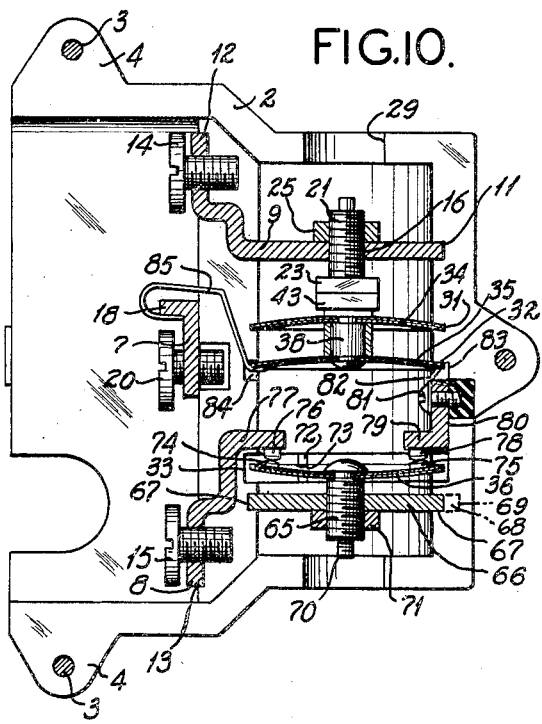
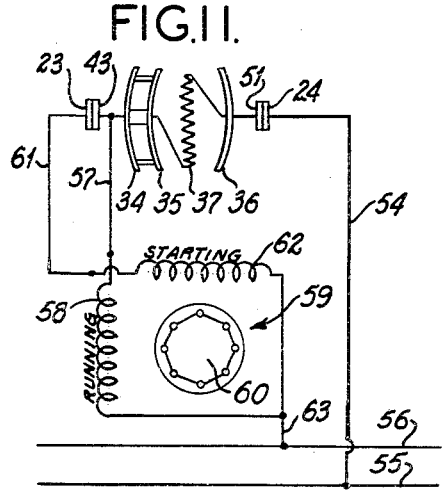
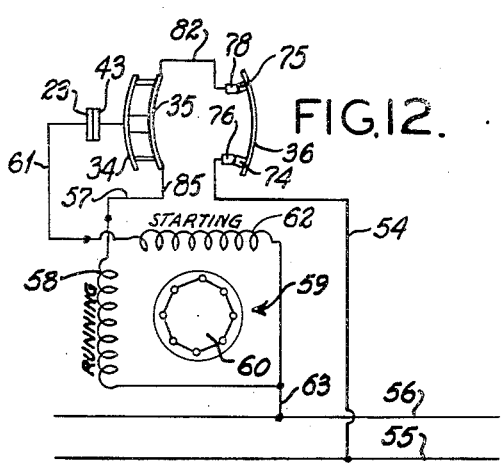

Patented July 9, 1940

2,207,422

UNITED STATES PATENT OFFICE

2,207,422

PROTECTIVE MOTOR STARTING SWITCH

Victor G. Vaughan and John D. Bolesky, Attleboro, Mass., assignors to Metals & Controls Corporation, Attleboro, Mass., a corporation of Massachusetts Application November 14, 1938, Serial No. 240,262

7 Claims. (Cl. 200—116)

This invention relates to protective motor starting systems, and with regard to certain more specific features to electrical switch devices and systems which incorporate in one structure both a motor-protection thermostat and a motor-starting switch.

Among the several objects of the invention may be noted the provision of a switch device and system of the class described which protects an electrical motor from injurious effects due to overheating; the provision of a switch device and system of the class described which acts to cut out the starter winding of a motor using such switch, after a certain period of elapsed time; the provision of a switch of the latter type controlled by thermostatic means; the provision of a switch of the latter type which is unaffected in its operations by changes in ambient temperature; the provision of a thermostatic switch and system for protecting motors against damage from overheating caused by excessive voltage in the supply line, or caused by overloading the motor; the provision of a switch of the class described which embodies both the motor-protection switch and the starter-winding switch in one simple structure; and the provision of a switch of the class described which is simple and economical to make, and safe and foolproof in its operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims:

In the accompanying drawings, in which is illustrated one of various possible embodiments of the invention:

Fig. 1 is a front elevation of a switch embodying the present invention;

Fig. 2 is a side elevation of the switch of Fig. 1;

Fig. 3 is a top plan view of the switch of Fig. 1;

Fig. 4 is an enlarged back elevation of the switch of Fig. 1;

Fig. 5 is a vertical cross section taken substantially along line 5—5 of Figures 3 and 4;

Fig. 6 is a horizontal cross section taken substantially along line 6—6 of Fig. 5;

Figs. 7 and 8 are vertical cross sections similar to Fig. 5, illustrating different operative positions of the switch;

Fig. 9 is a horizontal cross section similar to Fig. 6, showing an alternative form of heater element;

Fig. 10 is a vertical cross section similar to Fig. 5, showing an alternative embodiment of the invention; and, Figs. 11 and 12 are diagrams of electrical circuits embodying the switches of Figures 5 and 10, respectively.

Similar reference characters indicate corresponding parts throughout the several views of the drawings.

Some types of electric motors in use today will not start when they are placed across a voltage supply circuit unless the rotor is in some way brought up to speed. In these motors it is customary to place in parallel with the main motor winding a so-called "starting winding" which will provide the torque-current-voltage characteristics and relationships necessary to start the motor. This starting winding generally draws a great deal more current than is necessary to run the motor, and after the motor has come up to speed, it is advisable to provide some form of switch, either mechanical or electrical, to cut out this starting winding and allow the motor to run on its running winding only. One manner of cutting out this starting winding is to use a switch which is actuated by the rotation of the rotor of the motor itself so that when the motor has reached a certain speed, centrifugal forces or spring forces or other means will mechanically break the circuit to the starting winding. Another method, and perhaps the oldest, is to use a hand switch to throw in the starting winding and running winding and when the motor has come up to speed the hand switch is brought back to position whereby it cuts out the starting winding. Still a third method, and the one with which the present invention is concerned, is that of using a time switch which will keep the starting winding in the circuit until the motor has had sufficient time to come up to speed, and then the starting winding is automatically cut out. This method of timing the starter-winding switch can be done either mechanically, with a spring motor or other mechanically actuated motors, or by means of electric relays.

Electric relays as used for this purpose can be either the type which has a time delay circuit built in, or a thermostatically actuated relay type. It is the latter type with which the present invention is concerned. The trouble with prior thermostatically actuated electric relays is that ambient temperatures affect the working of a relay of this type. For example, on a hot day the relay may respond too quickly and not allow the motor to come up to speed, with resulting cutting-in and cutting-out of the starter winding as the thermostat cools and heats, and consequent overheating of the motor because of the excess of current drawn. On a cold day the relay will not cut out the starter winding fast enough, so that the starter winding will be in circuit longer than is necessary, with resulting heating up of the motor and inefficient operation due to excessive current drawn. A purpose of the present invention is to provide an electric relay to cut out the starting winding, which is unaffected by changes in ambient temperature.

Very often in its use, a motor will be subjected to heavy overloads, or to excessively high or low voltages. The effect of these various types of loads is to cause the motor to overheat, and if this overheating is not detected in time the motor will be injured by the burning out of its windings. Consequently, it is becoming more and more the practice to install in connection with the motor a motor-protection switch which is influenced by the heat of the motor, and by excessive current values. When the motor reaches a certain maximum safe operating temperature, temperatures in excess of which are considered detrimental to the motor windings, the motor-protection switch operates to disconnect the motor from the main circuit until the motor cools to a predetermined temperature. It is an additional purpose of the present invention to provide a motor-protection switch which is simple and economical to make, foolproof in its action, and relatively simple in mechanical construction.

Inasmuch as it is advisable to have both these switches on a motor, it is highly desirable to incorporate them in one structure. It is an additional purpose of the present invention to provide a switch assembly which incorporates both a motor-protection switch, and a thermal relay to cut out the starting winding, which assembly is relatively simple and economical to make, easily adjusted, and small and compact in size.

Referring to the drawings, numeral 1 indicates an outside casing made of a molded resin, such as phenolic condensation products, preferably one that is relatively heat-resistant. The casing 1 is formed of two matching halves 2 which are held in assembly by rivets or the like 3 in ears 4. Additional notched ears 5 provide means for mounting the switch, as on the motor to be controlled thereby. Mounted inside this casing 1 are three brackets, 6, 7, and 8, made of brass or other good electrically conducting metal. Brackets 6 and 8 have disc-like portions 9 and 10 which fit into molded grooves 11 in the inside wall of the casing, and arm portions 12 and 13 which extend to the open back of the casing and receive terminal screws 14 and 15, to facilitate making electrical connections with the brackets. Disc portions 9 and 10 of brackets 6 and 8 have center holes 16 and 17 through them, whose purpose will be explained later. Bracket 7 is of generally rectangular shape, except for a lip-like extension 18, and the ends of bracket 7 fit into molded slots 19 (Fig. 6) in casing 1 to support said bracket 7. Bracket 7 carries a terminal screw 20.

Through the center holes 16 and 17 of brackets 6 and 8 are threadably fitted screws 21 and 22, respectively. Fastened on the inner ends of screws 21 and 22 as shown (by welding or by other means so as to furnish good electrical connection) are contact plates 23 and 24, respectively. Lock nuts 25 and 26 serve to hold screws 21 and 22 respectively in their proper position after they have been finally adjusted. The other ends of screws 21 and 22 are provided with reduced portions 27 and 28 which serve as a means of turning the screw to adjust it in its proper position. The screws 27 and 28 are accessible for adjustment through holes 29 and 30 provided in casing 1.

Mounted in grooves 31, 32 and 33 suitably molded in the interior wall of casing 1 are three snap acting thermostatic plates or discs 34, 35, and 36, respectively. Discs 34, 35, and 36 are shown as made according to the teaching of J. A. Spencer Patent 1,448,240, but they may also be made according to J. A. Spencer Patent 1,895,590. Discs 34 and 35 co-act as a thermal relay unaffected by changes in ambient temperature. Disc 36 acts as a motor-protection disc when subjected to the heat of the motor or to heat from a heater wire 37 to be described.

Each of discs 34 and 35 has a center hole through both of which passes in a turnable manner a stud 38. A collar 39, sliding on stud 38, serves to maintain the centers of the discs 34 and 35 the same distance apart as are the outer peripheries of the discs. As in the copending application of Harold M. Wilson, Serial No. 150,242, filed June 25, 1937, the two discs 34 and 35 are held in parallel relationship, to form a rate-of-change thermostat, that is, one which is affected, not by the ambient temperature itself, but by the rate of change of the ambient temperature; hence it may well be called an ambient-compensated thermostat. On one side disc 34 abuts shoulder 40 formed on stud 38. Collar 39 is now placed on stud 38, then disc 35 is placed on stud 38, a washer 41 is placed over the reduced end of stud 38, and the end of stud 38 is headed over in rivet fashion, as indicated at numeral 42 to securely fasten the whole assembly together. The fit of the various parts to each other is such that stud 38 is free to turn within the center holes of the discs, the discs are free to turn in relation to each other, and there is no binding on the part of any one part of the assembly to any other part. On the other hand, the parts are so placed together that there is no unnecessary play between them.

One end of stud 38 carries a contact plate 43 similar to contact plate 23 to cooperate with plate 23. Fastened to this contact plate 43 is a flexible electric connection 44, such as pigtail wire or an extremely thin copper braid or strip. The other end of connection 44 is connected to lip 18 on bracket 7 so as to form an electrical connection between bracket 7 and contact plate 43.

Fitting into the groove 33 suitably molded in the interior wall of casing 1 is disc 36. Passing through a center hole 46 of this disc 36 is a stud 47 which, by means of a suitable abutment and shoulder 48 on one side and riveted-over head 50 on the other side, is fastened to the disc in a rotatable manner. One end of this stud 47 carries a contact plate 51 similar to contact plate 24. Contact plate 51 cooperates with 24 to make and break electrical connections.

Attached at one end to stud 38 and at the other end to stud 47 is said heater wire 37 which takes the form of a generally flat spiral and which is made of Nichrome or other high-resistant wire such as is commonly used today. The purpose of this heater wire 37 will be explained later. Contact plates 23 and 43 co-act together to form an electrical connection when discs 34 and 35 are in one (downwardly concave, Fig. 5) direction, and are separated when discs 34 and 35 snap to the other direction (upwardly concave, Fig. 7). Contact plates 24 and 51 co-act to form an electrical connection when disc 36 is in one (upwardly concave, Fig. 5) direction, and separate and break the electrical circuit when disc 36 snaps to the other (downwardly concave, Fig. 8) position.

The manner in which discs 34 and 35 co-act to be unaffected by changes in ambient temperature is fully explained in the said copending application of Harold M. Wilson, Serial No. 150,242, but a recapitulation here will serve to point out and explain the main features of the present thermal relay. Discs 34 and 35 are so mounted in the casing 1 that they tend to snap in opposite directions upon the same change in temperature. However, by virtue of the length of the connecting stud 38 and collar 39, the centers of the discs 34 and 35 are fixed at the same distance apart as the outer peripheries of the discs. Thus, one of the discs is mechanically restrained in its abnormal position at any temperature. By this means, forces are mechanically set up in the two discs 34 and 35 which, with forces engendered in the discs by changes in ambient temperature, always tend to balance each other in opposite directions. The mechanical and temperature-induced forces are determined by the characteristics of the discs, and by the temperatures set in the discs during their manufacture. The discs can be so made that when assembled as shown in Fig. 1 they will either tend to stay in either of their two positions (that is, the assembly of disc 34 and disc 35 will stay either above its central plane, as in Fig. 5, or below its central plane, as in Fig. 7), or the forces can be so arranged that the discs 34 and 35 will snap back to one position upon change in temperature of a given amount. If, now, one of the discs 34 and 35 is subjected to a greater rate of temperature change than the other disc, then the forces engendered in that disc will be sufficient to unbalance the system and the system as a whole will snap to its other position. As long as the temperature of this one disc is maintained a given amount above the temperature of the other disc, the system will stay in that position. If, however, the temperature of the one disc begins to change and approaches the temperature of the other disc by a predetermined amount, then the system will return to its former position. The motion of the system of the two discs from one position to the other is a snap-action. Thus, the co-action of the two contacts 23 and 43 will be that of a snap-break or snap-connection, which is highly desirable in making or breaking an electrical connection. Heater wire 37 supplies the heat necessary to heat disc 35 at a greater rate than disc 34, and cause the disc system 34 and 35 to snap downwardly as drawn, thus breaking electrical contact between contacts 23 and 43 when heater wire 37 is energized.

Disc 36 has two positions of stable equilibrium, one as shown in Fig. 5, and the other position of opposite convexity (that is, as shown in Fig. 8) when the temperature of the disc 36 is changed a predetermined amount. Heater wire 37 also serves when energized to a certain extent to heat disc 36 and cause it to snap upwardly with a snap-action thus breaking electrical contact between contacts 24 and 51.

The electrical connections to the device as thus described, and the consequent manner of operation of the device, are as follows:

Referring to Fig. 11, a wire 54 connects contact 24, through bracket 8 and terminal screw 15 to one wire 55 of power wires 55 and 56. A wire 57 connects contact 43, through bracket 7 and terminal screw 20, to one end of the running winding 58 of a motor 59, having a rotor 60, for example. A wire 61 connects contact 23, through bracket 6 and terminal screw 14, to one end of the starting winding 62 of the motor 59. The other power supply wire 56 is connected by a wire 63 directly to the other terminals of both windings 58 and 62 of the motor 59.

With the discs 34 and 35 in the position shown in Fig. 5, so that contact plates 23 and 43 make electrical contact, and with disc 36 in the position shown so that contact plates 24 and 51 make electrical contact, current will flow from power wire 55 through wire 54, bracket 3, stud 22, contact plate 24, contact plate 51, heater wire 37, stud 38, contact plate 43, flexible or pigtail connection 44, terminal screw 20, running winding 58 of the motor 59, and wire 63, back to the other power wire 56. Current also flows through contact plate 23, stud 21, bracket 6, terminal screw 14, starting winding 62 of the motor 59, and wire 63, back to the other power wire 56. The motor now starts to run because the starting winding 62 is connected with the voltage supply. Because of the large current flowing through the starting winding 62, heater wire 37 becomes hot and raises the temperature of disc 35 sufficiently to cause the disc system 34 and 35 to snap downwardly after a given interval of time, to the Fig. 7 position. This movement breaks the electrical circuit to the starting winding 62, through separation of contacts 23 and 43, and consequently the starting winding 62 is disconnected and thus is no longer operative. Because the starting winding 62 is no longer in the circuit, the current flowing through the motor and hence through the heater wire 37 decreases greatly. The value of the current flowing through heater wire 37 is now just sufficient to keep the temperature of heater wire 37 at a point which supplies sufficient heat to disc 35 to keep the disc system 34 and 35 from snapping back to its original, Fig. 5, position. The heat supplied by heater wire 37 is not sufficient to cause disc 36 to snap upwardly to break the electrical circuit to the running winding 58 of the motor. If, however, the motor should become overloaded, or an incorrect voltage should be applied to the motor, resulting in the motor heating up, then in the first case, because of overloading of the motor, more current will flow through the running winding 58 (as well as the starting winding 62 if it is still connected), and heater wire 37 will become hot enough to cause disc 36 to snap upwardly to the Fig. 8 position, and thus break the circuit to either the running winding 58 or to both windings, and stop the motor, by separating contacts 24 and 51. The snapping of disc 36 upwardly is also aided and influenced by the heat of the motor itself, provided the switch is mounted on the motor in the preferred manner. In case the voltage applied to the motor is excessive, so that abnormally high current flows through heater wire 37, then the same action takes place.

It is not to be assumed that when the starting winding is in the circuit and heater wire 37 is at its highest temperature for normal starting conditions, that this heat is sufficient to cause disc 36 to snap upwardly. The duration of time that heater wire 37 is so highly energized is so short (being a matter of 1 or 2 seconds), and the heater wire 37 is so positioned in relation to disc 35 and disc 36, that before disc 36 has had time to be influenced by heater wire 37 enough to snap, the disc system 34 and 35 has snapped downwardly and broken the starting winding connection.

When the motor is stopped by a main line switch or the like, so that no current flows through any of the connections, then the discs 34 and 35 approach each other in temperature, and the system 34 and 35 snaps back to the position shown in the drawings. Since disc 36 is still maintaining contacts 24 and 51 together, the circuits are thus completed for another motor starting. If the motor has become stalled to the extent that the circuit to the running winding 58 is interrupted at contact plates 24 and 51, then no current will flow through heater wire 37 and the device will cool so that the starting winding 62 connection through contact plates 23 and 43 is again made, in point of time before contacts 24 and 51 are again brought together. Then when the motor cools off to a safe temperature, namely, the point at which contact plates 24 and 51 again make the circuit, the device will automatically start up.

As will be evident, the device and system as thus far shown and described are capable of many variations within the scope of the present invention.

For example, Fig. 9 shows a modification that is somewhat easier to assemble than the previous embodiment, and is superior in several other respects. In Fig. 9 the coiled heater wire 37 of the previous embodiment has been replaced by a spiral strip-type heater 64, which may easily be stamped from a thin sheet of electrical resistance metal and then suitably formed. The heater 64 is connected in the switch in the same manner as the wire heater 37 of the previous embodiment, and functions in the same manner in the switch and system.

Under some conditions the heater 37 as a separate unit may be dispensed with, and its function taken over by discs 35 and 36, provided these discs be made of a material presenting proper electrical resistance to generate and radiate the required amount of heat for the desired purposes. Such a device is shown in Fig. 10, and the system in which it is used is shown in Fig. 12. In the switch of Fig. 10, the thermostatic disc 36 is rotatably supported on an adjustable mounting screw 65 which is in turn threadedly supported in a disc-like mounting plate 66. Plate 66 is clamped in position in an internal groove 67 in casing 1, and is kept from rotating relative thereto, for example, by a lug extension 68 from plate 66 which fits in a companion recess 69 in casing 1. The lower end of mounting screw 65 is squared off, as indicated at numeral 70, for adjusting the relative position of screw 65 in plate 66, and a lock nut 71 secures the screw 65 as thus adjusted. By thus adjusting the screw 65, the operating temperature of the disc 36 is adjusted.

The inner end of screw 65 rotatably mounts and secures the central portion of disc 36, but without clamping said disc so tightly as to substantially impede its thermostatic movements. The periphery of disc 36 extends into groove 33 in casing 1 as heretofore, but said groove 33 is now made wide enough (axially of the casing 1) that it offers no obstruction to thermostatic movement of disc 36. Suitable means are provided to prevent the disc 36 from rotating relative to casing 1, such as, for example, a molded bead 72 on the inner wall of casing 1 inside groove 33 entering a notch 73 on the periphery of disc 36.

Mounted as by welding on preferably diametrically opposite portions of the periphery of disc 36 are two electrical contacts 74 and 75. A companion fixed contact 76 for contact 74 is mounted, as by welding, on a supporting arm 77 forming an extension of bracket 8 (with its terminal screw 15). A companion fixed contact 78 for contact 75 is mounted, as by welding, on a bracket 79 which is in turn rigidly mounted in an axial groove 80 (forming an extension from groove 33) in casing 1, and may be secured by a screw or rivet 81.

A wire 82 is welded or otherwise electrically connected at one end to bracket 80, and at the other end to a point on the periphery of thermostatic disc 35. As in the prior embodiments, the periphery of disc 35 is restrainedly mounted in an internal groove 32 in casing 1, but a notch 83 extending axially from groove 32 is provided in casing 1 to facilitate the connection of wire 82 to disc 35. At a diametrically opposite position to notch 83 in casing 1 is a similar notch 84, providing room for an electrical connection from a point on the periphery of disc 35 diametrically opposite the point of connection of wire 82, to another wire 85. Wires 82 and 85 are preferably, although not necessarily, flexible. The other end of wire 85 is connected electrically to bracket 7, carrying its customary terminal screw 20.

In all other respects, this Fig. 10 embodiment is similar to the Fig. 5 embodiment.

The circuit connections for the Fig. 10 switch are shown in Fig. 12, and are as follows: Wire 54 connects power wire 55 to stationary contact 76, by way of terminal screw 15 and bracket 8. Wire 57 connects wire 85 to one end of the running winding 58 of motor 59, by way of terminal screw 20 and bracket 7. Wire 61, as in Fig. 11, connects stationary contact 23 to one end of the starting winding 62 of the motor 59, by way of terminal screw 14 and bracket 6. The other ends of both running winding 58 and starting winding 62 are connected, by wire 63, to the other power wire 56. As thus connected in circuit, the device operates as follows:

Current flows from one power line 55 through wire 54, contact 76, contact 74, disc 36, contact 75, contact 78, connecting wire 82, disc 35, wires 85 and 57, to the running winding 58, and thence through wire 63 to the other power line 56. Current also traverses the same path as far as disc 35, but then goes through the hub joining disc 34 and 35 to contact 43, contact 23, wire 61, to the starting winding 62, and thence through wire 63 to the other power line 56. The combination of the starting and running currents passing through part of disc 35 and the whole of disc 36, respectively, is now sufficient to heat disc 35 (because of the resistance to current of the metal from which disc 35 is made), to cause the disc system of 34 and 35 to snap to the right viewed as in Fig. 12, thus breaking circuit connections at contacts 23 and 43. When this happens the starting winding 62 is disconnected from the circuit, and then the running winding 58 draws sufficient current, by means of the resistance of disc 35, to keep disc 35 hot enough to keep the disc system of 34 and 35 in its right-hand position. If, however, the motor now becomes overloaded or draws more than its safe current, this additional current passing through disc 36 is sufficient to heat disc 36 to its snapping temperature, and it snaps to the right, thus breaking circuit connections at contacts 74 and 76, and 75 and 78. This throws the whole motor off the line. The resistances of discs 34, 35, and 36 are so arranged that when they are cooling with no current passing through them, the system of discs 35 and 34 snaps to the left before disc 36 snaps to the left. The motor then starts up again when disc 36 cools down and snaps to the left, closing the motor connections again at contacts 74, 76, and 75, 78.

It will accordingly be seen that in this Fig. 10, Fig. 12 embodiment, the switch functions in practically the same manner as in the previous embodiment, the major difference being that the discs of the Fig. 10 embodiment perform the dual functions of thermostatically responsive means and heat generating means, the latter controlling (and effecting) the effects of the former. It will accordingly be understood that the naming, separately, in the subsequent claims, of thermally responsive means or the equivalent and heat generating means or the equivalent, is not meant to indicate that such means are essentially physically separate entities, because they can well be, within the scope of the invention, one and the same physical thing or things.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. An electric switch comprising a snap-acting ambient-compensated thermostat, electrical circuit make-and-break means controlled thereby, a second thermostat responsive to ambient temperature changes, and electrical circuit make-and-break means controlled thereby, said switch providing internally generated heat affecting the operation of both of said thermostats.

2. An electric switch comprising a snap-acting ambient-compensated thermostat, electrical circuit make-and-break means controlled thereby, a second snap-acting thermostat responsive to ambient temperature changes, and electrical circuit make-and-break means controlled thereby, said switch providing internally generated heat affecting the operation of both of said thermostats.

3. An electric switch of the class described comprising a snap-acting ambient-compensated thermostat, a first movable contact controlled thereby, a first fixed contact cooperating with said first movable contact to make and break a first circuit, a snap-acting thermostat operable in response to ambient temperature changes, a second movable contact controlled thereby, and a second fixed contact cooperating with said second movable contact to make and break a second circuit, and an electrical resistance heating element positioned to affect both said ambient-compensated thermostat and said other thermostat.

4. An electric switch of the class described comprising a rate-of-change thermostat, a first movable contact controlled thereby, a first fixed contact cooperating with said first movable contact to make and break a first circuit, a thermostat operable in response to ambient temperature changes, a second movable contact controlled thereby, and a second fixed contact cooperating with said second movable contact to make and break a second circuit, and an electrical resistance heating element positioned to affect both said rate-of-change thermostat and said other thermostat, said rate-of-change thermostat comprising two dished composite thermostatic metal plates tending to snap in opposite directions in response to a temperature change, said other thermostat comprising a single dished composite thermostatic metal plate.

5. An electric switch of the class described comprising a rate-of-change thermostat, a first movable contact controlled thereby, a first fixed contact cooperating with said first movable contact to make and break a first circuit, a thermostat operable in response to ambient temperature changes, a second movable contact controlled thereby, and a second fixed contact cooperating with said second movable contact to make and break a second circuit, and an electrical resistance heating element positioned to affect both said rate-of-change thermostat and said other thermostat, said rate-of-change thermostat comprising two dished composite thermostatic metal plates tending to snap in opposite directions in response to a temperature change, said other thermostat comprising a single dished composite thermostatic metal plate, all three of said plates being coaxially mounted.

6. An electric switch of the class described comprising a rate-of-change thermostat, a first movable contact controlled thereby, a first fixed contact cooperating with said first movable contact to make and break a first circuit, a thermostat operable in response to ambient temperature changes, a second movable contact controlled thereby, and a second fixed contact cooperating with said second movable contact to make and break a second circuit, and an electrical resistance heating element positioned to affect both said rate-of-change thermostat and said other thermostat, said rate-of-change thermostat comprising two dished composite thermostatic metal plates tending to snap in opposite directions in response to a temperature change, said other thermostat comprising a single dished composite thermostatic metal plate, all three of said plates being coaxially mounted, with said heating element positioned between one of the plates of the rate-of-change thermostat and the plate comprising the other thermostat, but closer to the plate of the rate-of-change thermostat.

7. An electric switch of the class described comprising a rate-of-change thermostat, a first movable contact controlled thereby, a first fixed contact cooperating with said first movable contact to make and break a first circuit, a thermostat operable in response to ambient temperature changes, a second movable contact controlled thereby, and a second fixed contact cooperating with said second movable contact to make and break a second circuit, and an electrical resistance heating element positioned to affect both said rate-of-change thermostat and said other thermostat, said rate-of-change thermostat comprising two dished composite thermostatic metal plates tending to snap in opposite directions in response to a temperature change, said other thermostat comprising a single dished composite thermostatic metal plate, all three of said plates being coaxially mounted, and means for adjusting the axial separation of said thermostats.

VICTOR G. VAUGHAN.
JOHN D. BOLESKY.